US007890864B2

(12) United States Patent
Bartek et al.

(10) Patent No.: US 7,890,864 B2
(45) Date of Patent: Feb. 15, 2011

(54) DYNAMIC COMPOSITION OF HELP INFORMATION FOR AN AGGREGATION OF APPLICATIONS

(75) Inventors: Velda Bartek, Apex, NC (US); Kathryn H. Britton, Chapel Hill, NC (US); Samar Choudhary, Morrisville, NC (US); John R. Hind, Raleigh, NC (US); Shikha Srivastava, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1975 days.

(21) Appl. No.: 10/754,375

(22) Filed: Jan. 9, 2004

(65) Prior Publication Data
US 2005/0154986 A1 Jul. 14, 2005

(51) Int. Cl.
*G06F 3/00* (2006.01)
(52) U.S. Cl. .................... 715/714; 715/705; 715/708
(58) Field of Classification Search .............. 715/705, 715/708, 714
See application file for complete search history.

(56) References Cited

U.S. PATENT DOCUMENTS

| | | | | |
|---|---|---|---|---|
| 5,361,361 A * | 11/1994 | Hickman et al. | ........... | 715/705 |
| 5,893,916 A * | 4/1999 | Dooley | ........... | 715/523 |
| 6,011,537 A * | 1/2000 | Slotznick | ........... | 715/733 |
| 6,049,799 A * | 4/2000 | Mangat et al. | ........... | 707/10 |
| 6,256,668 B1 * | 7/2001 | Slivka et al. | ........... | 709/220 |
| 6,281,900 B1 * | 8/2001 | Ishikawa | ........... | 715/853 |
| 6,563,514 B1 | 5/2003 | Samar | | |
| 6,573,906 B1 | 6/2003 | Harding et al. | | |
| 6,584,496 B1 * | 6/2003 | Ludtke | ........... | 709/217 |
| 6,799,198 B1 * | 9/2004 | Huboi et al. | ........... | 709/203 |
| 6,801,222 B1 * | 10/2004 | Dunham et al. | ........... | 715/714 |
| 6,918,090 B2 * | 7/2005 | Hesmer et al. | ........... | 715/760 |
| 6,993,720 B1 * | 1/2006 | Hanoch et al. | ........... | 715/708 |
| 7,024,658 B1 * | 4/2006 | Cohen et al. | ........... | 717/117 |
| 2002/0053020 A1 | 5/2002 | Teijido et al. | | |
| 2002/0054152 A1 * | 5/2002 | Palaniappan et al. | ........ | 345/810 |
| 2002/0091993 A1 * | 7/2002 | Walley et al. | ........... | 717/120 |
| 2002/0161876 A1 * | 10/2002 | Raymond | ........... | 709/223 |
| 2002/0188612 A1 * | 12/2002 | Yu et al. | ........... | 707/100 |
| 2002/0188613 A1 * | 12/2002 | Chakraborty et al. | ........ | 707/100 |
| 2003/0001875 A1 | 1/2003 | Black et al. | | |
| 2003/0018650 A1 * | 1/2003 | Priestley | ........... | 707/102 |
| 2003/0059009 A1 * | 3/2003 | Meyerson et al. | ........ | 379/93.17 |
| 2003/0137538 A1 | 7/2003 | Hesmer et al. | | |
| 2005/0065913 A1 * | 3/2005 | Lillie et al. | ........... | 707/3 |
| 2005/0065953 A1 * | 3/2005 | Bower et al. | ........... | 707/101 |

OTHER PUBLICATIONS

Microsoft, Microsoft Computer Dictionary, 2002, Micorsoft Press, 5th Edition, p. 409.*

* cited by examiner

*Primary Examiner*—Tadeese Hailu
*Assistant Examiner*—Nicholas S Ulrich
(74) *Attorney, Agent, or Firm*—Scott Paul, Esq.; Carey Rodriguez Greenberg Paul, LLP

(57) ABSTRACT

The present invention is a method, system and apparatus for producing a composite help view for an aggregation of applications. The method can include obtaining at least two separate help documents. Each of the separate help documents can have an association with a corresponding one of separate interface units aggregated together into a single aggregated view. Importantly, the separate help documents can be combined into a composition of help documents corresponding to the single aggregated view. Subsequently, the composition of help documents can be rendered in a help system view responsive to a request for help initiated in the single aggregated view.

16 Claims, 5 Drawing Sheets

DYNAMIC COMPOSITION OF HELP INFORMATION FOR AN AGGREGATION OF APPLICATIONS

BACKGROUND OF THE INVENTION

1. Statement of the Technical Field

The present invention relates to application help system and more particularly to providing composed help for an aggregation of applications.

2. Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Content aggregation systems such as portals represent a sensible solution to the problem of aggregating content through a channel paradigm in a single, network-addressable location. In consequence, aggregation technologies like portals have become the rage in content distribution.

Portlets are the visible interface units included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

New content distribution technologies like portal technology bring a new dimension to creating dynamically composed applications. For instance a portal server can aggregate a Web page using content from multiple, independently developed portlets. The portlets may be written by the same portlet writer, or a different portlet writer. Considering the dynamic nature of such aggregated pages, the conventional help mechanisms configured for use with singular applications cannot suffice for composite applications such as those produced in the portal environment.

For instance, it is well known that in singular application environment, a structured help document can be coupled to the singular application and triggered by the selection of a help option disposed within the user interface of the application. As a one to one correspondence exists between the help system and the application, the entirety of the help documentation can be accessed through the help system. In the portal environment, each portlet can be considered a separate interface unit which has been aggregated with other applications to form a composite application. As such, each portlet will have its own help system and a unified system of help will not exist.

While it has been suggested that a single comprehensive help document can suffice for aggregate applications, this view remains flawed because the composition forming the aggregate application can change based upon the personalization feature of portal technology. To present a comprehensive help document addressing all possible permutations of the applications in the aggregation can produce an unwieldy and unhelpful help document. Accordingly, there is a need for a help system that can dynamically aggregate help or information to match the aggregation of the pages in the composite application.

SUMMARY OF THE INVENTION

The present invention addresses the deficiencies of the art in respect to help files and provides a novel and non-obvious method, system and apparatus for composing a help file for an aggregation of applications. A method for producing a composite help view for an aggregation of applications can include obtaining at least two separate help documents. Each of the separate help documents can have an association with a corresponding one of separate interface units aggregated together into a single aggregated view. Notably, an interface unit is an aggregation of various widgets, fragments or units of views composed within a console view. Importantly, the separate help documents can be combined into a composition of help documents corresponding to the single aggregated view. Subsequently, the composition of help documents can be rendered in a help system view responsive to a request for help initiated in the single aggregated view.

In a preferred aspect of the present invention, the rendering step can include loading an index or a table of contents produced from a navigation view disposed within the single aggregated view. Subsequently, a help system navigation view can be formed based upon the table of contents. Finally, the help system navigation view can be rendered along with the rendering of the composition of help documents. In another preferred aspect of the invention, the rendering step can include the step of rendering both a view of the composition of help documents, and individual views of the separate help documents.

In yet another preferred aspect of the invention, an image map of the single aggregated view can be obtained and the image map can be rendered in a help system view. Subsequently, a rendering of the view of the composition of help documents can be activated responsive to a selection of a portion of the image map not formed from a view of one of the separate applications. Otherwise a rendering of a single one of the individual views of the separate help documents can be activated responsive to a selection of a portion of the image map formed from a view of a corresponding one of the separate applications.

Significantly, the content of the composition of help documents can change when the aggregation of interface units change. In this regard, the method of the invention also can include updating the single aggregated view to include at least one different interface unit. As such, the composition of help documents can change to include a new separate help document corresponding to the at least one different interface unit. Once changed, the changed composition of help documents can be rendered in a help system view responsive to a request for help initiated in the updated single aggregated view.

Notably, the access restrictions imposed upon a user of the aggregation of applications can translate to the content of the help system. For instance, where a particular user or class of users are restricted to viewing an aggregation which includes a limited display, the corresponding help also can be limited to addressing the limited display. Thus, the method of the invention also can include the step of restricting help information in the composition of help documents for a particular user to reflect restrictions in the single aggregated view imposed upon the user.

In a system configured to produce a composite help view for an aggregation of applications, an application aggregator can be configured to aggregate individual interface units into a single aggregated view. A help system also can be configured to render a help system view. The help system view can include composite help documentation having at least two help documents. Each of the help documents can correspond to one of the individual applications. Finally, help invoking logic can be coupled to the help system and disposed in the single aggregated view.

In a preferred embodiment, the individual interface units can be portlets. Similarly, the single aggregated view can be a portal. Finally, the application aggregator can be disposed within a portal server. Optionally, the help system can be configured as a plug-in to an integrated development environment. In this regard, the integrated development environment can be the Eclipse environment which incorporates a help system accommodating plug-in logic. To that end, where the Eclipse environment hosts the help logic plug-in, the composite help documents can be stored as archives which can be accessed through the environment.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for dynamically composing and rendering a composite help view for an aggregation of applications. In accordance with the present invention individual help files associated with corresponding applications can be dynamically combined in a single composition as the corresponding applications are combined in the aggregation of applications. The aggregation of applications subsequently can be rendered in an aggregated view along with a logic for invoking the composition. Responsive to the operation of the logic, the composition can be rendered in a composite help view.

In a preferred aspect of the invention, a table of contents representing a navigation hierarchy can be generated for applications configured for aggregation. Using the table of contents, different application aggregations can be invoked so as to navigate across multiple aggregations as is known in the art. Importantly, however, when the composition has been invoked, the table of contents can be passed to the composition and a corresponding navigation hierarchy can be rendered therein. In this way, a one to one mapping of the user interface of the aggregation of applications and the user interface of the help view can be maintained.

Figure 1:
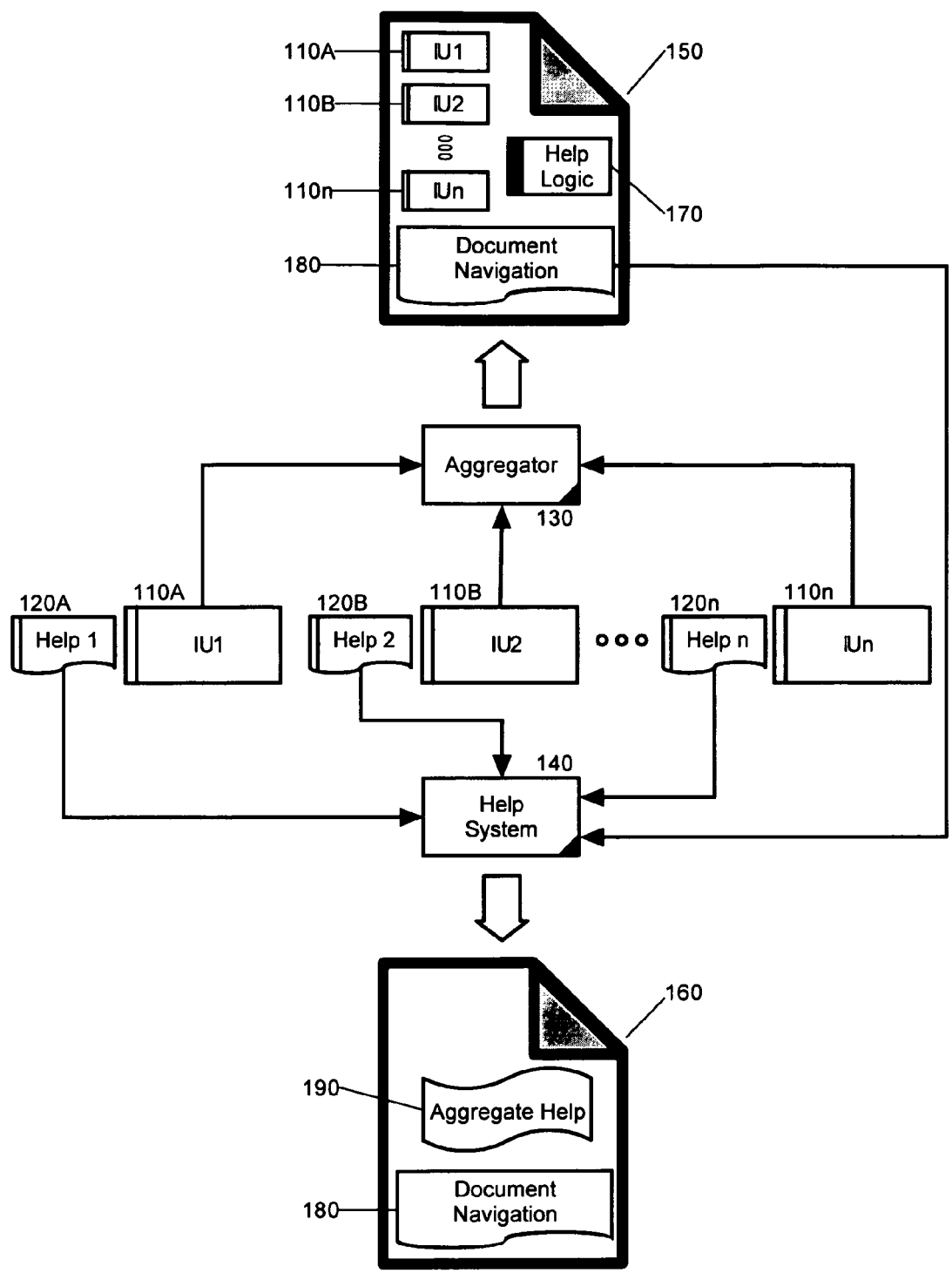
FIG. 1 is schematic illustration of a help composition system which has been configured in accordance with the present invention.

FIG. 1 is schematic illustration of a help composition system which has been configured in accordance with the present invention. The system can include a multiplicity of applications 110A, 110B, 110n configured for aggregation into a single view 150. In a preferred albeit nonexclusive aspect of the present invention, the applications 110A, 110B, 110n can be {{interface units}} portlet pages configured for aggregation into a portal view. Notably, each of the applications 110A, 110B, 110n can include an associated help document 120A, 120B, 120n. The content of each of the help document 120A, 120B, 120n can be directed to the specific context of a corresponding one of the applications 110A, 110B, 110n.

An application aggregator 130 can be coupled to each of the applications 110A, 110B, 110n. The application aggregator 130 can combine selected ones of the applications 110A, 110B, 110n to form the single aggregation 150. In particular, the application aggregator 130 can place the visual interface for each of the selected ones of the applications 110A, 110B, 110n into a computed position in the single aggregation 150 so as to provide a personalized application interface as is well known in the art. Notably, in addition to combining selected ones of the applications 110A, 110B, 110n in the aggregation 150, the aggregator 130 further can include a document navigation view 180 in the aggregation 150 so as to permit the navigation of multiple aggregations through the view of the single aggregation 150.

In accordance with the present invention, a help system 140 can be coupled to the help document 120A, 120B, 120n. The help system 140 can combine the help documents 120A, 120B, 120n to form a single composition 190. Notably, the single composition 190 can be produced only in respect to those interface units 120A, 120B, 120n selected for inclusion in the aggregation 150. In this regard, the single composition 190 can be produced exclusively for the aggregation 150. Accordingly, as it will be recognized by the skilled artisan, multiple compositions can be generated for different aggregations, thereby providing a customized help view for different personalized arrangements of the interface unites 110A, 110B, 110n.

To couple the aggregation 150 to the help system 140, help logic 170 can be disposed within the visual view of the aggregation 150. The help logic 170 can be a selectable entity in the visual view of the aggregation 150 which has been programmed to access the composition 160, for example by providing an identity of the composition 160, or by providing an identity for the aggregation 150. In either case, the help logic 170 also can be programmed to pass the document navigation view 180, in the form of an index or table of contents for example, to the help system for parallel rendering in the composition along with the composition 190. As it is known in the art, disposing a selectable entity within a visual view of an interface unit can be implemented through conventional server page technology in which tag logic can generate an appropriate address through which additional content can be accessed responsive to the selection of the selectable entity.

Figure 2:
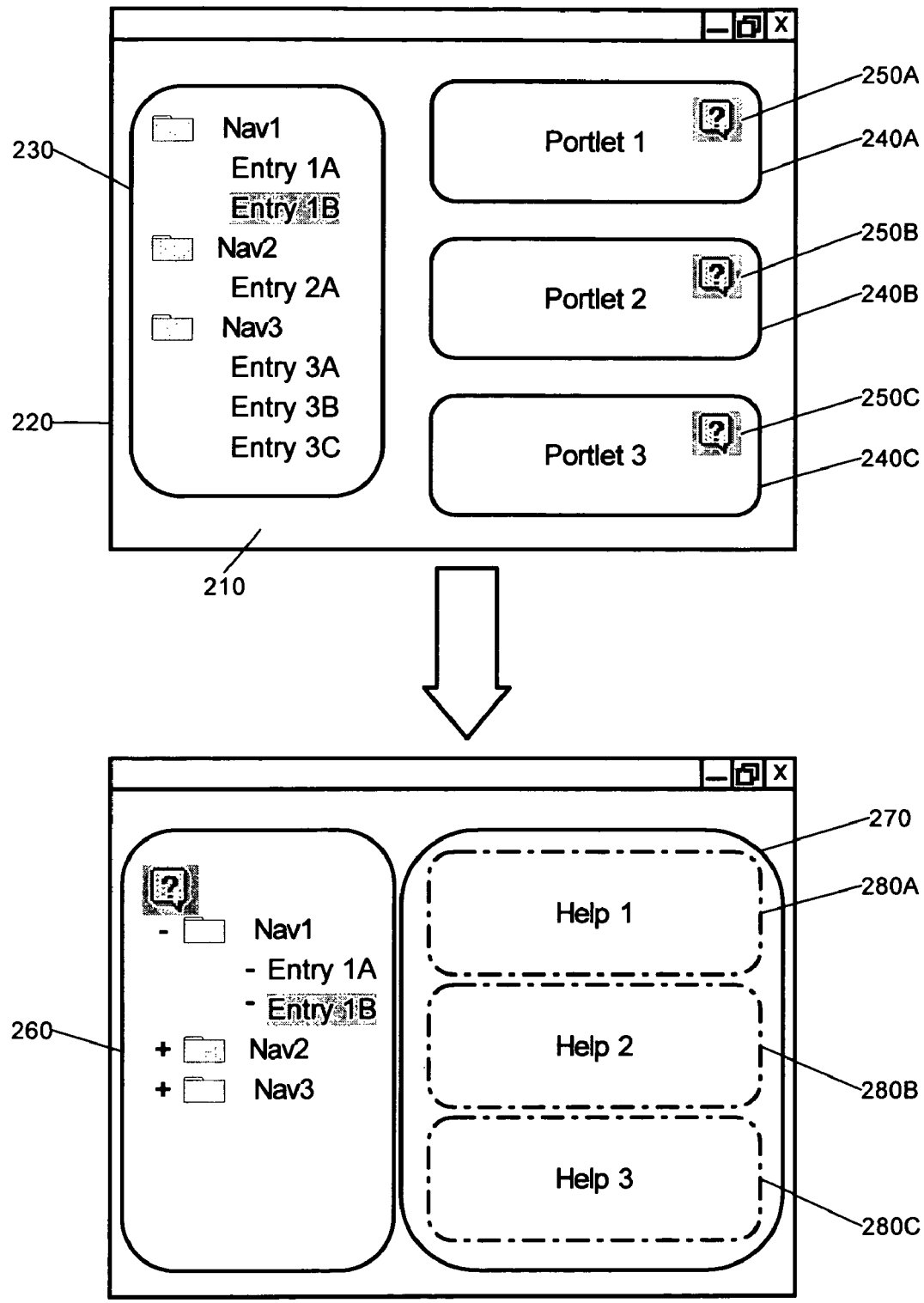
FIG. 2 is a pictorial illustration of a composite help view produced from an aggregated application in the system of FIG. 1.

In further illustration of the operation of a preferred albeit nonexclusive aspect of the present invention, FIG. 2 is a pictorial illustration of a composed help view produced from an aggregated application in the system of FIG. 1. As shown in FIG. 2, an aggregation 210 of multiple interface units 240A, 240B, 240C can be rendered in a content browser view 220. The interface units 240A, 240B, 240C can be rendered dynamically through the operation of an aggregator (not shown) such as an aggregator ordinarily associated with the production of a portal view through the selection and arrangement of portlets in a portal environment. A navigation view 230 also can be disposed in the aggregation 210 to permit the navigation of multiple other aggregations in the system.

Importantly, at least one activatable help icon 250A, 250B, 250C can be disposed in each of the interface units 240A, 240B, 240C. The activatable help icon 250A, 250B, 250C, responsive to its selection, can invoke a view for a composition 270 of help documents 280A, 280B, 280C in the content browser 220. More particularly, responsive to the selection of one of the activatable help icons 250A, 250B, 250C, a corresponding composition 270 of help documents 280A, 280B, 280C associated with the interface units 240A, 240B, 240C can be rendered in the content browser 220. Additionally, the navigation view 230 disposed within the aggregation 210 can be translated to a comparable navigation view 260 along with the composition 270.

It will be recognized by the skilled artisan that consolidating help information associated within individual interface units in an aggregation into a single view represents a significant enhancement over the separately viewable help documents of the conventional help system. Using the composite view of the help documents of the present invention, end users can view a single help topic that combines the help content for each individual interface unit in an aggregate view, or end users can view individual help topics associated strictly with an individual interface unit in the aggregation.

In this regard, though not illustrated, the composite view 270 further can be subdivided into a multi-view arrangement such as a tabbed view in which one view includes the composition of help documents while the remaining views in the arrangement include individual ones of the help documents for corresponding individual ones of the interface units. To further provide a strong mapping between the help view and the aggregation view, the titles for each interface unit in the aggregation can be retrieved and utilized in labeling the individual views of the help documents corresponding to the interface units.

Figure 3:
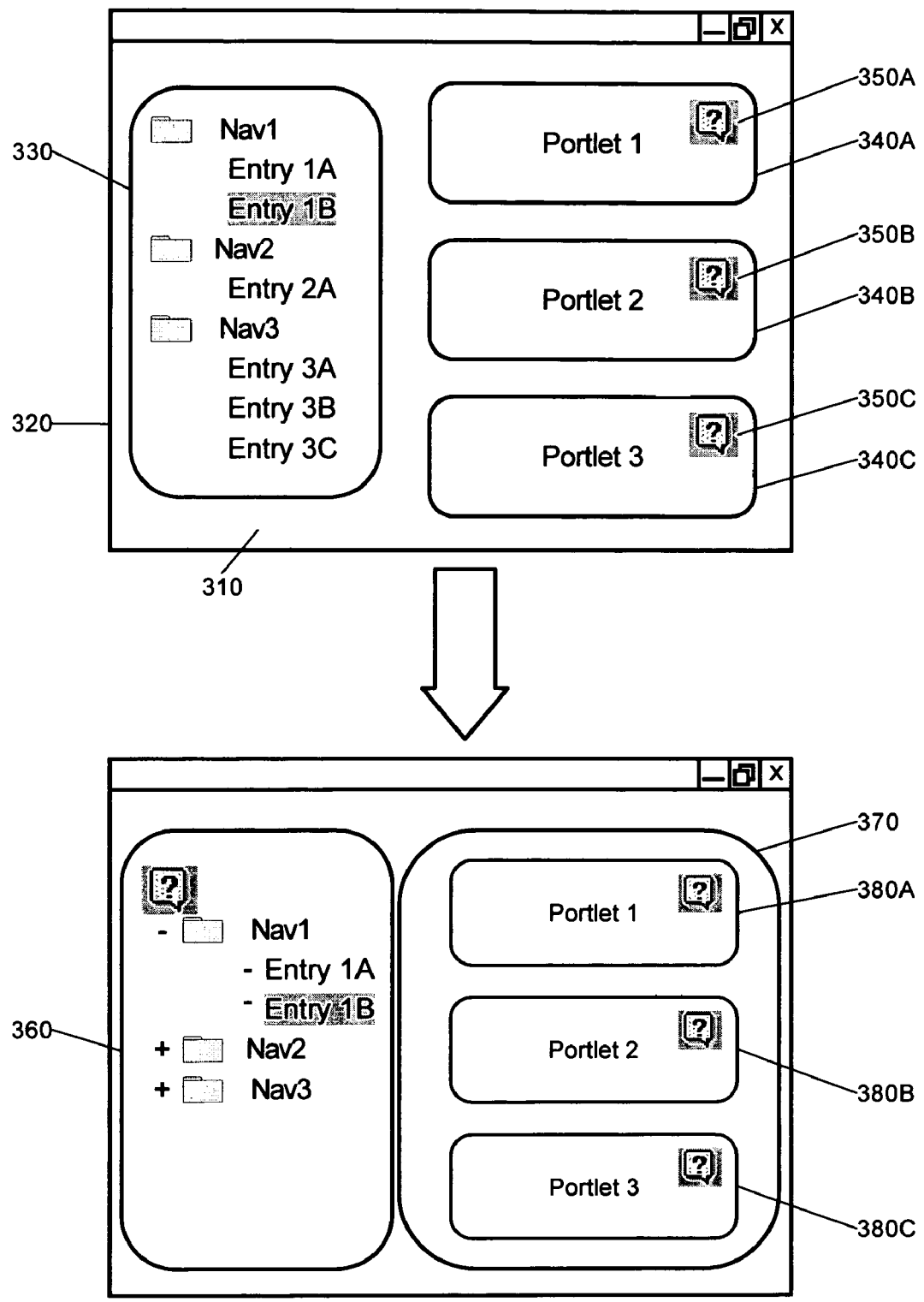
FIG. 3 is a pictorial illustration of an alternative composite help view produced from an aggregated application in the system of FIG. 1.

To provide yet a stronger correlation between the aggregation and the composition, an activatable image known in the art as an image map, can be created to replicate the aggregation and can be disposed within the composition to provide a stronger visual connection for the end user when interacting with the help system. To that end, FIG. 3 is a pictorial illustration of an alternative composed help view produced from an aggregated application in the system of FIG. 1. As before, one or more interface units 340A, 340B, 340C can be arranged within an aggregation 310 rendered in a content browser 320. Also, a navigation view 330 can be rendered along with the interface units 340A, 340B, 340C in the aggregation. Finally, at least one activatable help icon 350A, 350B, 350C can be disposed within respective ones of the interface units 340A, 340B, 340C.

Responsive to the activation of any one of the help icons 350A, 350B, 350C, the help system can render a replica image 370 of the aggregation 310 along with the navigation view 360. In particular, the replica image 370 can be activatable and mapped accordingly. For instance, selecting the portion 380A of the image 370 which appears similar to the view of the interface unit 340A can result in the rendering of help content strictly associated with the interface unit 340A. By comparison, selecting the portion 380B of the image 370 which appears similar to the view of the interface unit 340B can result in the rendering of help content strictly associated with the interface unit 340B. Finally, selecting the portion 380C of the image 370 which appears similar to the view of the interface unit 340C can result in the rendering of help content strictly associated with the interface unit 340C. Notably, selecting the image 370 at any other point can result in the rendering of a composition of help content for all interface units 340A, 340B, 340C.

Figure 4:
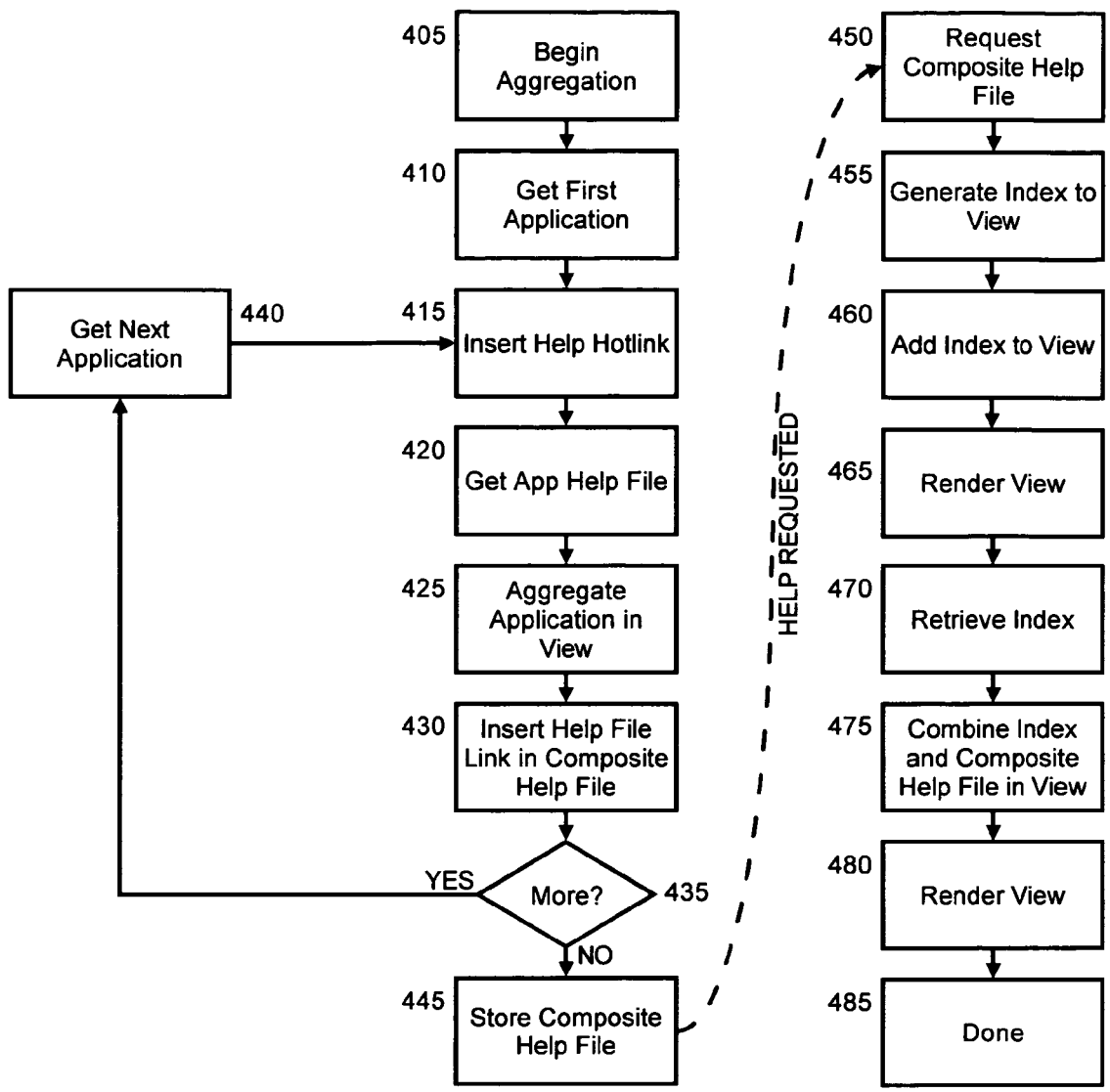
FIG. 4 is a flow chart illustrating a process for composing a help view for an aggregation of applications in the system of FIG. 1; and, FIG. 5 is a pictorial illustration of a personalized bookshelf disposed within a help display.

FIG. 4 is a flow chart illustrating a process for composing a help view for an aggregation of interface units in the system of FIG. 1. The processes illustrated in FIG. 1 can be bifurcated into two sub-processes—a process for generating the help composition for the aggregation, and a process for activating and rendering the composition. Beginning first with the process for generating the composition in block 405 and continuing through block 410, a first interface unit can be selected for aggregation. In block 415, help logic for activating the help system can be disposed within the interface unit. Specifically, the help logic can be server page logic configurable through a tag library. Responsive to the activation of the help logic, the help logic can generate an appropriate network address for the help system along with identifying information for the aggregation.

Continuing in block 420, an associated help file can be selected for association with the aggregation. In block 425 the application can be aggregated into the view of the aggregation while in block 430 the help file can be added to the composite help file, for instance by inserting a hyperlink reference to the associated help file in the composition. In decision block 435, if additional interface units remain to be processed, in block 440 the next interface unit to be added to the aggregation can be selected and the process can continue in block 415 through block 430.

Once all interface units have been combined in the aggregation, and when all associated help files have been combined into the composition, in block 445 the composition can be stored in the help system. In this regard, the composition can be stored within an archive file which can be accessed by a conventional help system such as the help system included within the Eclipse open development platform. Once the view of the aggregation has been rendered, an end user can select the help hotlink in the view which can trigger the rendering of a help view through the help system.

In response, in block 450, the composite help file stored in block 445 can be retrieved. Subsequently, in block 455, a navigation index to the aggregation can be generated and in block 460 the navigation index can be rendered in the aggregation view. Finally, in block 465, the view of the aggregation can be rendered for the benefit of the end user. In block 470, the index to the aggregated view generated in block 450 can be retrieved as well and converted to a format suitable for use in a help system view. In block 475 the index and the composite view can be combined in a help system view and in block 480 the help system view can be rendered. Finally, in block 485, the process can end.

Importantly, in a preferred embodiment, the dynamic aggregation of help can be produced through a centralized help display system such as the information center provided in the open source Eclipse platform. As it is known in the art, interface units developed for inclusion in a composite view can incorporate help pages which interface units and help pages can be combined in a single archive. Accordingly, the aggregator can generate the dynamic aggregation of help by combining the help pages in the single archive for the multiple interface units when the interface units are selected for incorporation in a composite view.

Preferably, at the time of integrating the help pages into a single aggregation of help and further at the time of creating the index, a number of intelligent queries can be executed against the help pages associated with the interface units. The intelligent queries can be formed based upon administrator provided information disposed within the help pages, including a reference to the content associated with the help pages. The resulting references to corresponding content from the intelligent queries can be stored in the form of a "bookshelf". The bookshelf can contain linked references to different help pages in the single aggregation through the help index. In this way, preferred and common searches can be pre-specified and re-used on demand by an end user.

Figure 5:
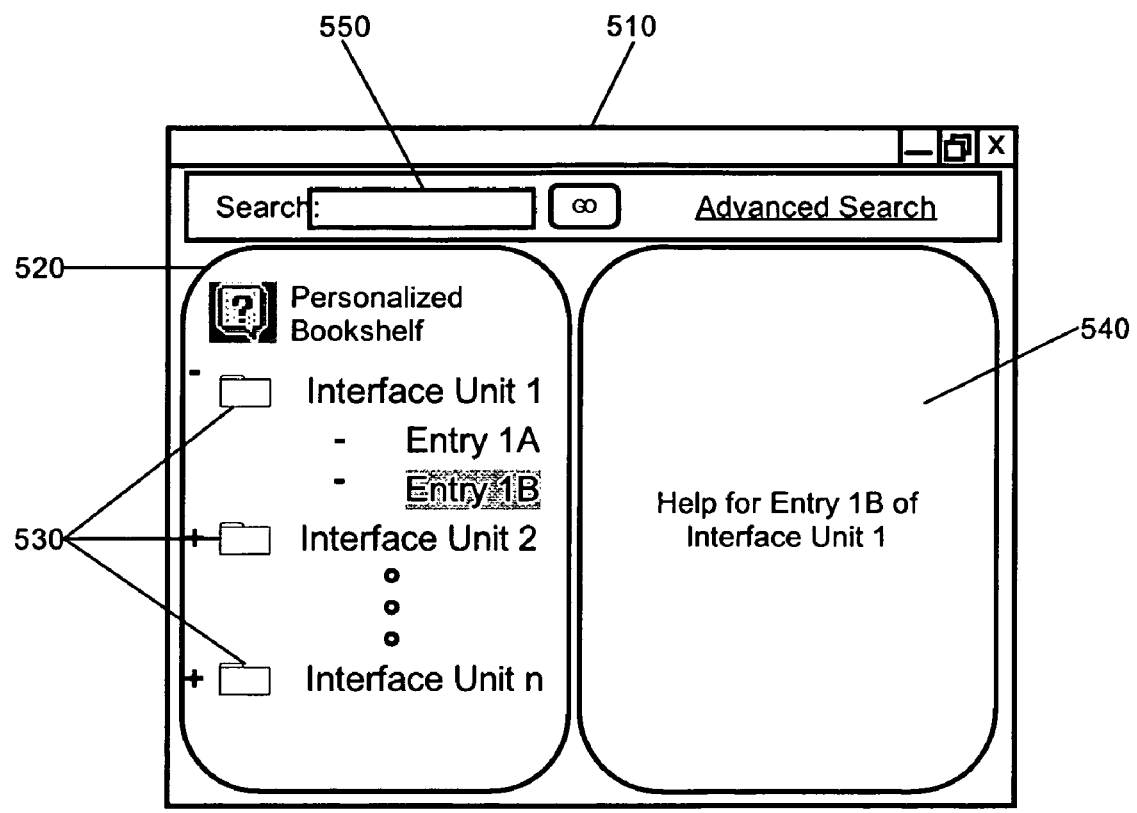

In further illustration, FIG. 5 is a pictorial view of a personalized bookshelf 520 disposed within a help display 510. The personalized bookshelf can include a hierarchical listing of pre-specified searches 530 for different interface units. Upon activating any one of the pre-specified searches 530, the corresponding help content 540 can be rendered within the help display 510. Notably, searching logic 550 can be provided for the bookshelf 520. In this regard, the bookshelf 520 which in itself is a pre-specified search, can further be searched in an ad hoc fashion by the end user. Consequently, finely tuned search results can be provided through the pre-screening mechanism of the bookshelf 520.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for producing a composite help view for an aggregation of applications, the method comprising the steps of:
   obtaining at least two separate help documents, each of said at least two separate help documents having an association with a corresponding one of separate interface units aggregated together into a single aggregated view;
   combining said at least two separate help documents into a composition of help documents corresponding to said single aggregated view; and,
   rendering said composition of help documents in a help system view responsive to a request for help initiated in said single aggregated view.

2. The method of claim 1, wherein said rendering step further comprises the steps of:
   loading an index produced from a navigation view disposed within said single aggregated view;
   forming a help system navigation view based upon said index; and,
   rendering said help system navigation view along with said rendering of said composition of help documents.

3. The method of claim 1, wherein said rendering step comprises the step of rendering both a view of said composition of help documents, and individual views of said separate help documents.

4. The method of claim 3, wherein said rendering step further comprises the steps of:
   obtaining an image map of said single aggregated view;
   rendering said image map in a help system view;
   activating a rendering of said view of said composition of help documents responsive to a selection of a portion of said image map not formed from a view of one of said separate interface units; and,
   otherwise activating a rendering of a single one of said individual views of said separate help documents responsive to a selection of a portion of said image map formed from a view of a corresponding one of said separate interface units.

5. The method of claim 1, further comprising the steps of:
   updating said single aggregated view to include at least one different interface unit;
   changing said composition of help documents to include a new separate help document corresponding to said at least one different interface unit; and,
   rendering said changed composition of help documents in a help system view responsive to a request for help initiated in said updated single aggregated view.

6. The method of claim 1, further comprising the step of restricting help information in said composition of help documents for a particular user to reflect restrictions in said single aggregated view imposed upon said user.

7. A system for producing a composite help view for an aggregation of applications comprising:
   an application aggregator configured to aggregate individual interface units into a single aggregated view;

a help system configured to render a help system view comprising composite help documentation comprising at least two help documents, each of said at least two help documents corresponding to one of said individual interface units; and, help invoking logic coupled to said help system and disposed in said single aggregated view.

8. The system of claim 7, wherein said individual interface units are application portlets, wherein said single aggregated view is a portal, and wherein said application aggregator is disposed within a portal server.

9. The system of claim 7, wherein said help system is configured as a plug-in to an integrated development environment.

10. The system of claim 7, wherein said help system further comprises a configuration for generating a personalized bookshelf for said at least two help documents.

11. A machine readable storage having stored thereon a computer program for producing a composite help view for an aggregation of applications, the computer program comprising a routine set of instructions which when executed by the machine cause the machine to perform the steps of:

obtaining at least two separate help documents, each of said at least two separate help documents having an association with a corresponding one of separate interface units aggregated together into a single aggregated view;

combining said at least two separate help documents into a composition of help documents corresponding to said single aggregated view; and, rendering said composition of help documents in a help system view responsive to a request for help initiated in said single aggregated view.

12. The machine readable storage of claim 11, wherein said rendering step further comprises the steps of:

loading an index produced from a navigation view disposed within said single aggregated view;

forming a help system navigation view based upon said index; and, rendering said help system navigation view along with said rendering of said composition of help documents.

13. The machine readable storage of claim 11, wherein said rendering step comprises the step of rendering both a view of said composition of help documents, and individual views of said separate help documents.

14. The machine readable storage of claim 13, wherein said rendering step further comprises the steps of:

obtaining an image map of said single aggregated view;

rendering said image map in a help system view;

activating a rendering of said view of said composition of help documents responsive to a selection of a portion of said image map not formed from a view of one of said separate interface units; and, otherwise activating a rendering of a single one of said individual views of said separate help documents responsive to a selection of a portion of said image map formed from a view of a corresponding one of said separate applications.

15. The machine readable storage of claim 11, further comprising the steps of:

updating said single aggregated view to include at least one different interface unit;

changing said composition of help documents to include a new separate help document corresponding to said at least one different interface unit; and, rendering said changed composition of help documents in a help system view responsive to a request for help initiated in said updated single aggregated view.

16. The machine readable storage of claim 11, further comprising the step of restricting help information in said composition of help documents for a particular user to reflect restrictions in said single aggregated view imposed upon said user.

* * * * *